United States Patent [19]
Hawkins et al.

[11] Patent Number: 5,855,342
[45] Date of Patent: Jan. 5, 1999

[54] SYSTEM FOR MOUNTING ELONGATE STRUCTURES AND WIRING

[75] Inventors: Patrick A. Hawkins, Plymouth; Andrew J. Gross, West St. Paul; Dante J. Osland, Cottage Grove, all of Minn.

[73] Assignee: Pipe Pier, Inc., Plymouth, Minn.

[21] Appl. No.: 733,559

[22] Filed: Oct. 21, 1996

[51] Int. Cl.$^6$ .................................................. F16L 3/22
[52] U.S. Cl. .......................................... 248/68.1; 248/55
[58] Field of Search .............................. 248/68.1, 49, 55, 248/74.1, 74.4, 65, 73, 687, 688, 634, 678, 346.2

[56] References Cited

U.S. PATENT DOCUMENTS

| | | | |
|---|---|---|---|
| D. 367,329 | 2/1996 | Nelson | 25/118 D |
| 1,945,332 | 1/1934 | Robinson | 16/94 |
| 2,909,054 | 10/1959 | Phillips | 72/105 |
| 3,298,644 | 1/1967 | Sherburne | 248/55 |
| 3,390,854 | 7/1968 | Sherurne | 248/55 |
| 3,689,015 | 9/1972 | Johnson | 248/70 |
| 3,963,205 | 6/1976 | Hageman | 248/55 |
| 3,968,323 | 7/1976 | Blanchet | 248/68.1 |
| 3,980,262 | 9/1976 | Lee | 248/55 |
| 4,344,206 | 8/1982 | Hermanson | 16/94 R |
| 4,502,653 | 3/1985 | Curtis, Jr. | 248/55 |
| 4,516,296 | 5/1985 | Sherman | 248/68.1 |
| 4,542,871 | 9/1985 | Fortsch | 248/73 |
| 4,638,966 | 1/1987 | Ford | 248/62 |
| 4,708,554 | 11/1987 | Howard | 411/84 |
| 4,783,040 | 11/1988 | Lindberg et al. | 248/74.3 |
| 4,826,113 | 5/1989 | Winters | 248/72 |
| 4,961,553 | 10/1990 | Todd | 248/62 |
| 5,141,186 | 8/1992 | Cusic | 248/68.1 |
| 5,217,191 | 6/1993 | Smith | 248/55 |

OTHER PUBLICATIONS

"Aickinclamps—Adjustable Pipe Clamps", Product Information from Aickinstrut, 3 pgs (15, 16 and 19) (Published prior to Oct. 21, 1996).

"Cush–A–Clamp—Cushion Clamping Systems", Product Brochure from ZSi, Inc., 15 pgs (Mar. 1996).

"O Strut Engineering Catalog No. 92", Product Information from M–CO; a Division of Michigan Hangar Co., Inc., 56 pgs. (1987).

"Pipe Pier—Flat Roof Pipe Support Systems", Product Information distributed by Hawkins & Jahnke Associates, Inc., 2 pgs (Published after Oct. 21, 1996).

"Product Specification Sheet", for product DOWBK–200, from Amcon American Converters, Inc., 1 pg (Aug. 20, 1996).

"Quick Pipe Block—the Labor Saver", Product Information from Nelson Olsen Inc., 2 pgs (Published prior to Oct. 21, 1996).

"Roof Pipestands", Product Information from Miro Industries, 4 pgs, (Published prior to Oct. 21, 1996).

Primary Examiner—Leslie A. Braun
Assistant Examiner—Anita M. King
Attorney, Agent, or Firm—Schwegman, Lundberg, Woessner & Kluth, P.A.

[57] ABSTRACT

A mounting system providing protection to the mounting surface and flexibility to accommodate movement of the mounted structures. In one application, a pipe mounting system for rooftop mounting which provides a base conforming to the roof and protects the roof from penetration of the base. The pipe mounting system providing freedom of motion in every direction to prevent damage to the roof structure. The pipe mounting system designed to withstand weather extremes.

15 Claims, 4 Drawing Sheets

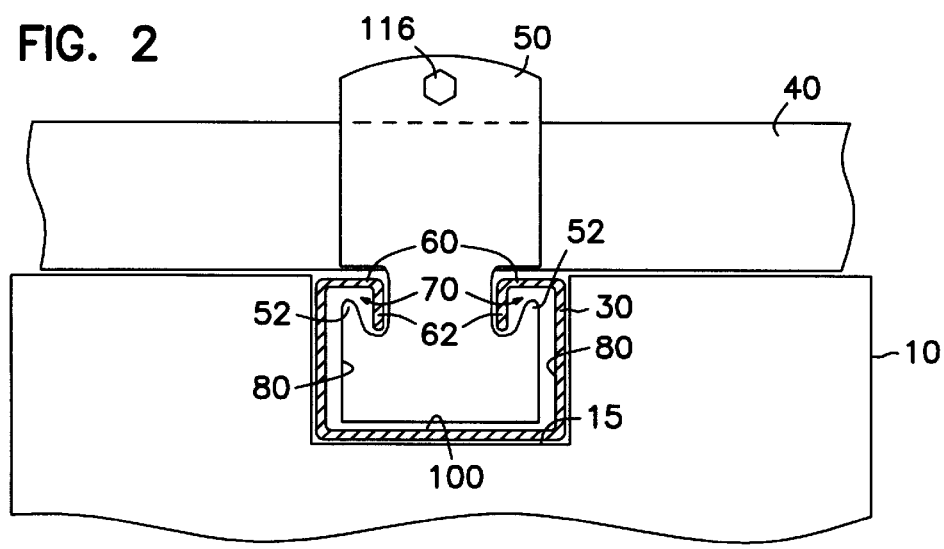
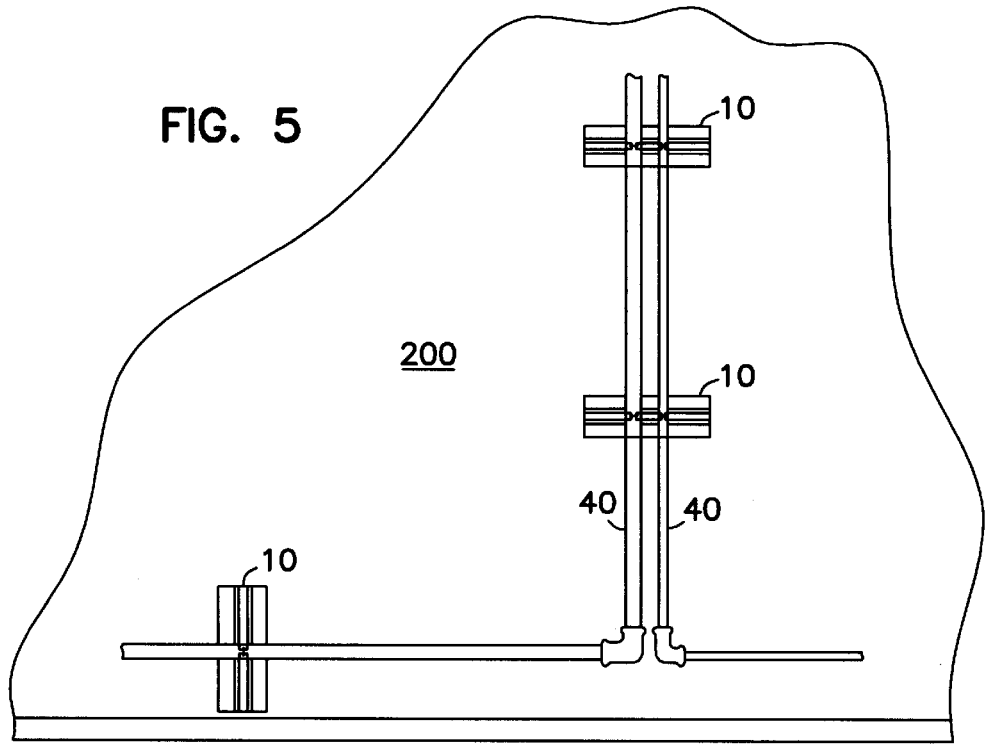
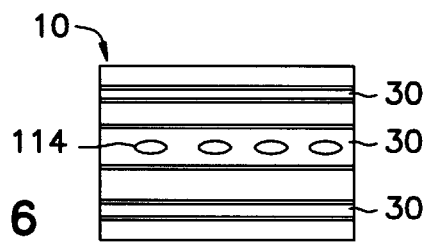

SYSTEM FOR MOUNTING ELONGATE STRUCTURES AND WIRING

FIELD OF THE INVENTION

The present invention relates to mounting of elongate structures, and in particular provides a system for mounting elongate structures, such as pipes, conduit, and other tubular structures and wiring on a surface.

BACKGROUND OF THE INVENTION

There are several design considerations involved in pipe mounting systems. For example, in rooftop mounting of plumbing, heating, ventilating, and air conditioning, some of the design considerations include the weight of the pipes on the roof and the possible damage to the roof surface due to expansion and contraction of the pipes. Mounting systems which do not provide a secure and adequate surface area will damage the roof, and potentially cause leakage and further damage to the interior of the building.

Other design considerations for mounting systems include the materials used for the mounting system. Some materials are more susceptible to deterioration than others. For example, in climates where snow and rain are common, these elements can deteriorate some mounting structures. Unprotected metal structures will rust and wood mounting structures will rot. In locations where extreme heat or humidity are common, the mounting structures may also deteriorate. Once the mounting structure becomes damaged, it is likely to cause significant damage to the roof.

One attempt at mounting pipes has been to use wood mounting blocks located at spaced intervals along the pipe. The pipe is secured to the mounting block and then the entire assembly rests on the roof. One disadvantage of this system is that expansion and contraction of the pipes results in translation of the mounting blocks over the surface of the roof, which is likely to damage the roof. Another disadvantage is that wood mounting structures tend to rot and disintegrate, adding further possibility of damaging the roof. Additionally, different sized wood blocks may be needed for mounting on slightly irregular surfaces, so that the weight of the pipes is distributed to each wood block.

Another attempt at a pipe supporting device is described in U.S. Pat. No. 4,502,653 by Marvin R. Curtis, Jr. This structure has a flat bottom and an upwardly tapered structure with a pocket for positioning a pipe and roller positioned in a receiving trough. As the pipe expands or contracts, it rides on the roller which rotates within the trough, however, this structure does not provide a means to secure the pipe, nor does it provide for lateral motion of the pipe.

Another attempt at mounting pipes is called a QUICK "PIPE" BLOCK by Nelson-Olsen, Inc of Plymouth, Minn. The QUICK "PIPE" BLOCK is a 12"×6"×3.5" high density polyethylene block which rides on a ¾" STYROFOAM pad. A pipe is laid on the rigid block and a metal strap laid over the pipe is attached at each end by inserting fasteners into the rigid block. One disadvantage is that the block uses pre-drilled holes to receive the fasteners. If the predrilled holes do not provide adequate pipe placement the rigid block must either be drilled again or not used at all, frustrating rapid installation of piping. If the block detaches from the STYROFOAM pad, or the STYROFOAM pad deteriorates, the block may damage a roof due to repeated expansion and contraction of the piping. Another disadvantage is that different sized blocks may be needed for mounting on slightly irregular surfaces, so that the weight of the pipes is distributed to each block. This further frustrates rapid installation of piping. Another disadvantage of this system is that the holes in the rigid block limit the number and type of pipe fasteners which may be used, and the number of pipes which may be mounted to a single block are limited thereby.

Therefore, there is a need in the art for a mounting system which permits motion of the mounted structures but protects the mounting surface from damage. The mounting system should also provide flexibility in mounting structures so that a number of mounts and mounting positions are available, especially for the mounting of more than one structure. The mounting system should provide flexibility in mounting structures on slightly irregular surfaces. The mounting system should be durable and resilient to the weather elements. The mounting system should also be relatively low cost and easy to use.

SUMMARY OF THE INVENTION

The present disclosure describes a mounting system for mounting any elongate structure, such as tubular structures and wiring. In one embodiment a pliable base is fitted with a strut having a channel for receiving several types of clamps. The strut provides lateral mounting flexibility and support to the base. The base conforms to the mounting surface to prevent damage and also provides a flexible mount so that the mounted structures are free to change position without damaging the mounting surface, such as a rooftop membrane. The pliable nature of the base provides a soft interface with a roof or other surface and accommodates mounting of structures on slightly irregular surfaces. The base and strut are constructed with components which are weather resistant to avoid deterioration of the mounting system. The strut provides an infinite number of mounting positions and clamping options, which are especially beneficial for mounting of multiple elongate structures. Furthermore, the strut mounting conserves the amount of space used to secure multiple elongate structures to the mounting system.

In one embodiment, one or more clamps are attached to the strut to provide a mount for one or more pipes. In another embodiment, a variety of clamps are used for mounting any combination of pipe, electrical conduit, and/or wiring. In yet another embodiment, a roller type of clamp is used to provide longitudinal motion of the tubular structures supported thereby.

One embodiment of the present invention uses a 14 gauge steel channel strut embedded within a closed cell polyethylene foam base of approximate dimensions 10"×4"×4", however, it is to be understood that this embodiment is not intended in an exclusive or limiting sense. Other embodiments having different sizes and types of strut and different sizes and types of base exist which do not depart from the present invention. Rather, the embodiments described herein are intended to demonstrate the present mounting system and other embodiments within the scope and spirit of the present invention are possible.

BRIEF DESCRIPTION OF THE DRAWINGS

In the drawings, where like numerals describe like components throughout the several views:

FIG. 2 is an end view of one embodiment of the present mounting system;

FIG. 5 is a top plan view of a plurality of the mounting systems installed on a roof according to one embodiment; and FIG. 6 is a top view of another embodiment of the present mounting system.

DETAILED DESCRIPTION

In the following detailed description references are made to the accompanying drawings which form a part hereof, and in which is shown by way of illustration specific embodiments in which the inventions may be practiced. These embodiments are described in sufficient detail to enable those skilled in the art to practice the inventions, and it is to be understood that other embodiments may be utilized and that structural changes may be made without departing from the spirit and scope of the present inventions. The following detailed description is, therefore, not to be taken in a limiting sense, and the scope of the present inventions is defined by the appended claims and equivalents thereof.

Figure 1:
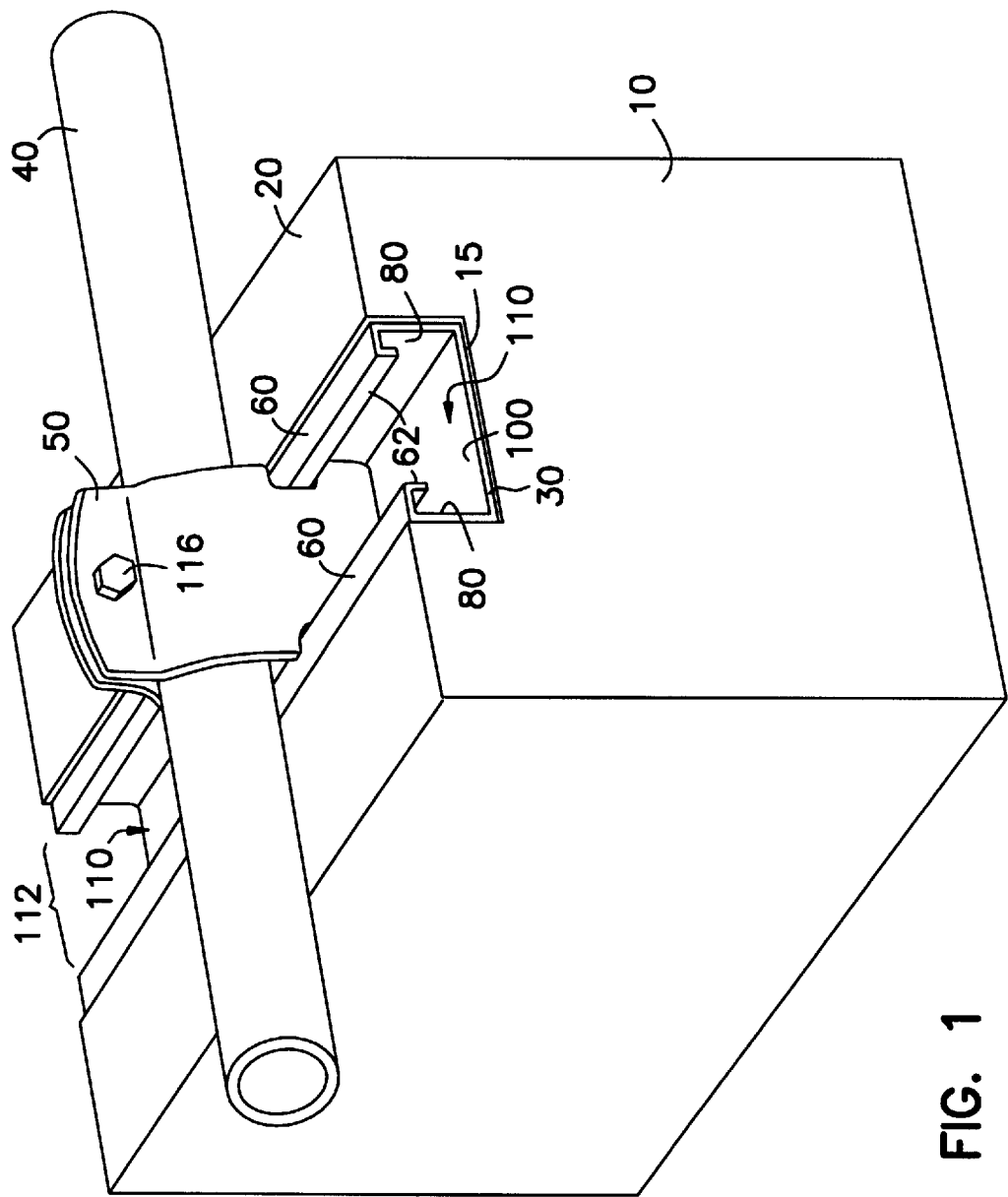
FIG. 1 is a side and top elevational perspective view of one embodiment of the present mounting system.

FIG. 1 shows a side elevational view of one embodiment of the present mounting system. In this embodiment, the base 10 is made of a pliable material, including, but not limited to, a closed cell polyethylene foam material, such as Dow BK-200. The base may be made of any weather resistant, pliable material. The material may have a sponginess or resilience which provides a cushioning effect when compressed. In one example, the base 10 is approximately a 4 inch by 4 inch by 10.5 inch block of closed cell polyethylene foam with an elongate strut 30 mounted flush within a groove 15 disposed in the center of the top surface 20 of the base 10.

The BK-200 closed cell polyethylene foam has a density of 1.8–2.5 pounds per cubic foot, a cell size of 1.7 mm, a compressive strength of 6–13 PSI at 25% deflection, a tensile strength of 48 PSI, a tear strength of 15 pounds per inch, and an elongation of 49 percent, however, other materials having other densities, cell sizes, compressive strengths, tensile strengths, tear strengths and elongations may be employed without departing from the scope and spirit of the present invention.

The embodiment using Dow BK-200 is not intended in a limiting or exclusive sense, and other materials may be used without departing from the scope and spirit of the present invention. Dimensions may also vary without departing from the scope and spirit of the present invention. Dimensions may be adjusted to handle different loads and for materials having different compressive strengths, densities, or any other parameter.

FIG. 2 shows one example of an embedded elongate strut 30. Strut 30 includes a pair of opposed side walls 80 extending upward from a back wall 100 defining a channel 110 for receiving clamps for mounting purposes. A pair of flanges 60 inwardly extend from the side walls 80 toward one another. Each flange 60 includes a depending lip 62 defining therebetween an opening 112 in the strut 30 into the channel 110. The opening 112 is approximately ⅞ inch in this example. The space defined between side wall 80, flange 60 and depending lip 62 is a recess 70 for retaining a clamp such as the clamp 50 to the strut 30 when the mounting systems are installed.

Throughout this document, the term "clamp" will be used to refer to a variety of different clamps, including, but not limited to, pipe clamps, cable clamps, electrical fittings, saddles, brackets, spring bolts, beam clamps, and roller clamps. Some of the available clamps are described in the O-Strut Engineering Catalog, which is incorporated by reference in its entirety, below. Some other types of clamps are adjustable pipe clamps, straps, and cable ties which mate to a channel, such as AIKINCLAMPS, AIKINSTRAPS, and UNISERTS made by Aickinstrut Corporation. Some other clamps include CUSH-A-CLAMP channel mounted clamping systems manufactured by ZSI, Incorporated of Westland, Mich. The CUSH-A-CLAMPs are useful for thermal isolation and shock isolation of piping and limit corrosion or abrasion of the piping by the clamp. In other embodiments, the clamp is a bolt whereby the bolt head is inserted into the channel with the threaded portion exposed and a nut and plate or strap are used to compress the pipe against the upper surfaces of the flanges 60 of the strut 30. Other mounting schemes employ clamps 50 with fingers 52 which are received or captured in the recesses 70 for positively securing the clamping devices to the channel 110 or strut 30. The clamps described herein are not intended to be exclusive or limiting, and other mounting structures exist which are clamps and which are not mentioned specifically herein. Such mounting structures are within the scope and spirit of the present invention.

The strut 30 may be made of any rigid material, including, but not limited to, steel and plastic. One example of a suitable strut 30 is a C-14HS steel strut by O-Strut, a division of Michigan Hangar Company, Inc. O-Strut manufactures several types of strut which may be embedded into the base, some of which are described in the O-Strut Engineering Catalog, which is hereby incorporated by reference in its entirety. Strut composition and dimensions may differ without departing from the scope and spirit of the present invention. Other manufacturers may make other struts which can be used, including, but not limited to, UniStrut, PowerStrut, and B-Line. The strut may be finished or rustproofed using paint or any other finishing or rustproofing method, including, but not limited to, galvanization, anodization, hot dipping, and electroplating. The back wall 100 or side walls 80 of the strut 30 may also optionally include perforations 114 as shown in FIG. 6, or other such modifications, to decrease weight without sacrificing strength.

Yet another embodiment incorporates a strut with notches formed in the bottom of depending lips 62 or in flanges 60 to provide discrete mating positions for clamps. Such notches may be provided to accommodate a predetermined elongate structure system or may be provided at adequate intervals along the strut to accommodate a variety of installations.

Mounting is accomplished in several ways. In one embodiment, a clamp 50 having fingers 52 is inserted into the channel so that the fingers are received within the recesses 70 and retained by the lips 62 and flanges 60 within the channel 110. This is to positively secure a structure or object to the strut 30, and thus to the base 10. A pipe 40, or any elongate structure, is secured to the strut 30 by inserting the fingers 52 of the clamp 50 into the channel 110 while encircling the pipe 40 so that the fingers 52 are captured within the recesses 70. A fastener 116 or other type of tensioner is then tightened to force the pipe 40 into contact with the upper surfaces of the flanges 60 of the strut 30. This frictional mount is adequate to secure the pipe 40 to the base 10.

Figure 3:
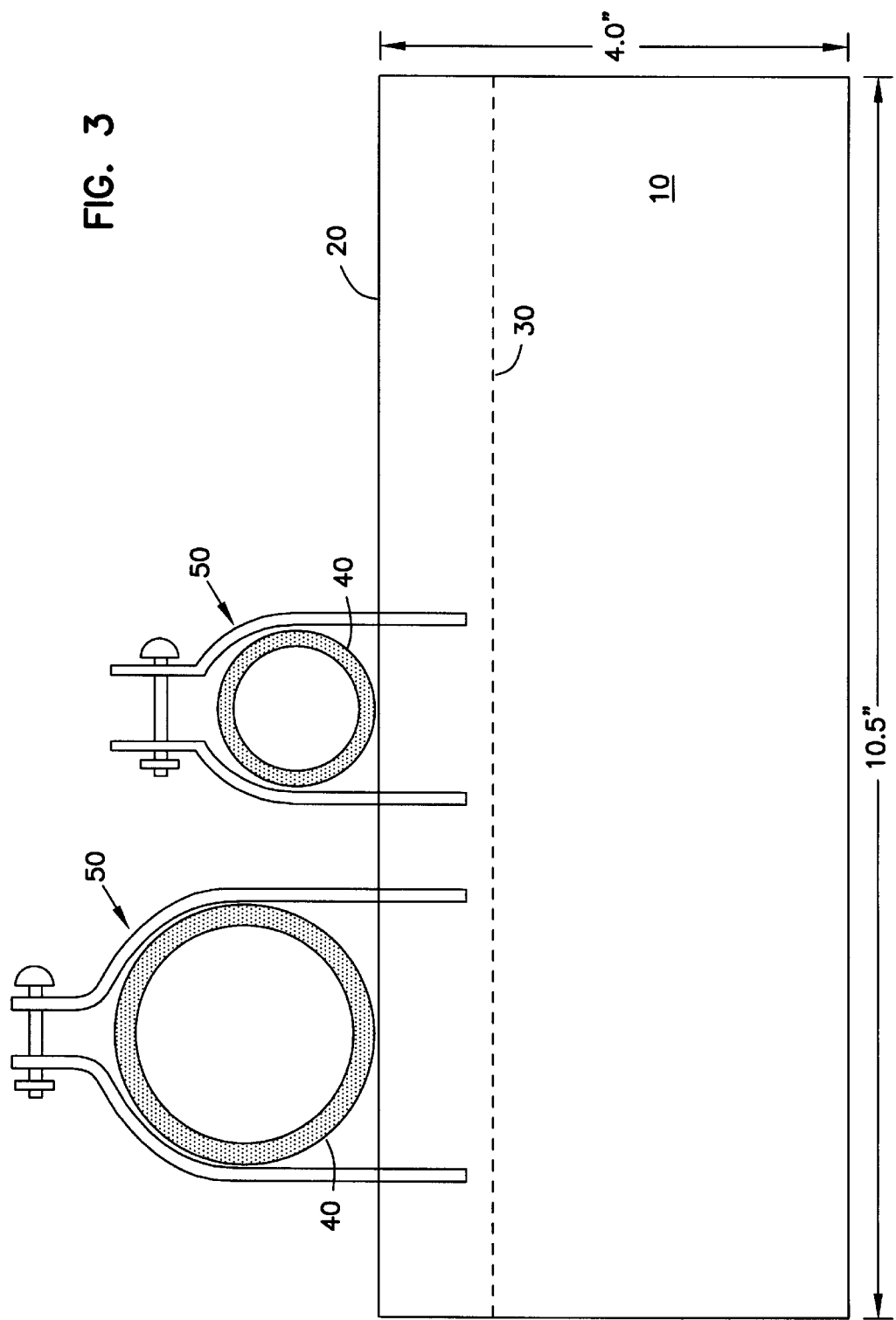
FIG. 3 is a side view of one embodiment of the present mounting system.
Figure 4:
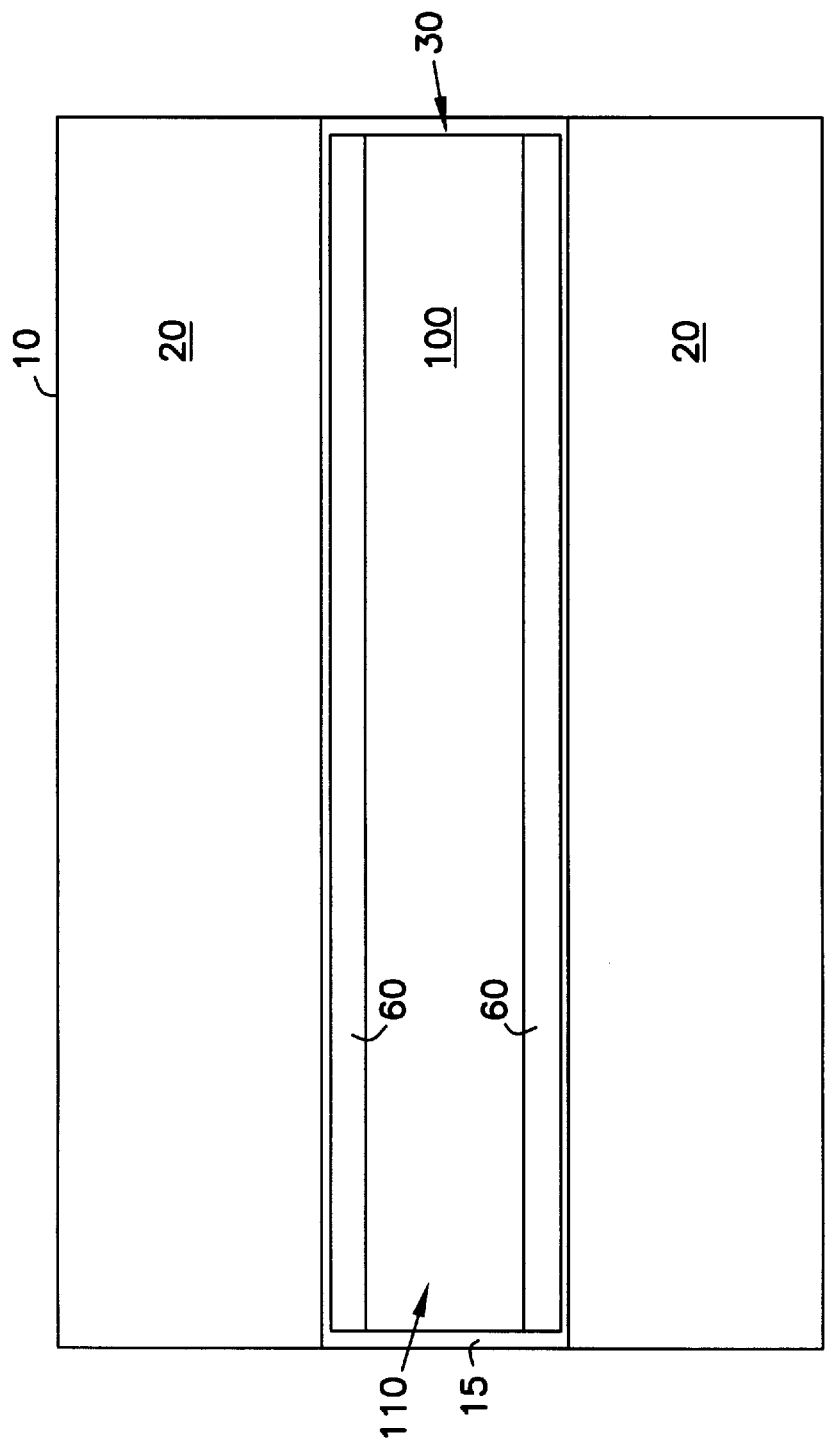
FIG. 4 is a top view of one embodiment of the present mounting system.

FIGS. 1, 3 and 5 show that one or more clamps 50 are mated to the strut 30 to secure one or more pipes 40 to the strut 30, and thus to the base 10. FIG. 4 shows a top view of the base 10 wherein the strut 30 is shown to be centrally mounted along the upper face 20 of the base 10. The strut 30 provides flexibility with regard to the position of the clamps and provides a mechanism for mounting a plurality of structures to a single base.

This system may be used to mount any tubular structure, including, but not limited to, plumbing, electrical conduit, air conditioning pipe and ductwork, and venting ductwork.

Positioning of the strut 30 within the base 10 provides stability to the base 10, which is a pliable material. The pliable nature of the base 10 allows it to mount to a surface and conform to the surface. The base 10 provides a flexible mount for the pipes 40 and provides degrees of freedom for motion in every direction: the pipes 40 may compress or stretch the base 10 in the vertical direction; the pipes 40 may translate longitudinally as the pipes compress or expand; and the pipes may experience lateral motion. This mounting system therefore also provides freedom for twisting of the pipes 40.

The flexibility of the mounting system provides additional protection to the mounting surface, such as a rooftop. This reduces the chance of penetrating the roof membrane. The mounting system is also resilient to the various weather extremes, both in its construction, and in its ability to accommodate motion on the part of the mounted structures due to expansion, contraction, vibration, wind, or other motion.

Central positioning of the strut 30 within the upper face 20 of the base 10 serves to distribute force imparted on the strut 30 evenly across the base 30. Centrally positioning the slot for the strut 30 also provides a firm mounting interface between the base 10 and the strut 30. Other embodiments exist in which the slot is positioned off center on the base. The dimensions of the base 10 may be adjusted to accommodate a range of weights; for example, the heavier the weight, the greater the height of the base 10. Such adjustments are also functions of the pliability and density of the base material.

Furthermore, the base 10 width and length is variable to accommodate translation of the pipes; for example, where a large torsional force is expected, the base 10 length and width may be adjusted to provide motion in the torsion of the elongate structure. The base 10 facilitates mounts on slightly irregular surfaces, thereby providing flexibility in layout of elongate structures over a plurality of individual bases on an irregular mounting surface.

FIG. 5 illustrates a plurality of mounting systems installed on a roof 200 of a building. The bases 10 are mounted spaced apart from on another to distribute the weight of the pipes or other elongate structures on the roof. Each base 10 may have one or more pipes secured thereto to support a system of elongate structures as needed.

The mounting system may be placed on a mounting surface or secured to the mounting surface using any type of fastener or bonding.

The mounting system is constructed by cutting the base to the desired shape and dimensions, cutting the strut to match the dimensions of the base, waterproofing the strut, cutting a slot in the base to receive the strut, and securing the strut to the base. Some ways to create the slot include, but are not limited to, cutting a groove in the base to form the slot or water jetting the base to create the slot. Some forms of securing the strut to the base include, but are not limited to, friction or compression mounting and bonding.

Other embodiments exist which include the use of a plurality of struts 30 as shown in FIG. 6 embedded within the base 10. In one embodiment, two struts are mounted in parallel, each having a different sized channel for accommodating different sized clamps using a single base 30. In another embodiment, the struts are mounted at angles to each other to accommodate mounting at angles of elongate structures. In one embodiment, the struts 30 are of the same size and in another embodiment the struts 30 are differently sized. The base 10 dimensions may be varied to accommodate the geometries of the struts and the weights of the elongate structures mounted thereto. Other variations and embodiments are possible without departing from the present invention. Several combinations of clamps and positions are contemplated by several embodiments of the present invention and are within the scope and spirit of the present invention.

Although the present invention has been demonstrated as a roof mounting system, the mounting system may be employed in a variety of mounting applications, including internal mounting or attic mounting. The mounting system may be used for a number of different plumbing, electrical, and duct mounting applications. Furthermore, the dimensions of the base may differ without departing from the scope and spirit of the present invention. Also the types of clamps used and the dimensions of the channel may vary for different applications. The base may be constructed of any pliable material which is weather resistant and provides adequate stability for mounting the strut and supporting the mounted structures.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the mechanical arts will readily appreciate that the present invention may be implemented in a very wide variety of embodiments. This application is intended to cover any adaptations or variations of the preferred embodiment discussed herein. Therefore, it is manifestly intended that this invention be limited only by the claims and the equivalents thereof.

What is claimed is:

1. A mounting system, comprising:

a base;

an elongate strut embedded within the base, the elongate strut having a channel formed by a first side wall, a second side wall, and a back wall, integrated such that an opening is formed between the first side wall and the second side wall, the first side wall including a first flange having a depending lip forming a first recess and the second side wall including a second flange having a depending lip forming a second recess, the first flange lip and the second flange lip defining the opening, the channel mating with a clamp;

the clamp adapted for fastening an elongate structure to the strut, the clamp including a first finger which mates with the first flange and the first recess and a second finger which mates with the second flange and the second recess, the clamp adapted to secure the elongate structure to the base;

wherein the elongate strut is embedded within the base such that the opening is exposed to receive the clamps;

wherein the base is a pliable foam material; and whereby the base is adapted to provide a pliable interface with a roof or other surface.

2. The mounting system of claim 1, wherein elongate strut is plastic or metal.

3. The mounting system of claim 1, wherein the elongate strut is centered in a top surface of the base.

4. The mounting system of claim 1, wherein the clamp is a pipe clamp.

5. The mounting system of claim 1, wherein the base comprises polyethylene foam.

6. A mounting system, comprising:

a base made of pliable material; and an elongate strut embedded within the base, the elongate strut having a channel formed by a first side wall, a second side wall, and a back wall, integrated such that an opening is formed between the first side wall and the second side wall, the channel for mating with a clamp, wherein the elongate strut is embedded within the base such that the opening is exposed to receive the clamp; and wherein the base is adapted to provide a pliable interface with a roof or other surface.

7. The mounting system of claim 6, wherein the base includes a flat bottom surface for placement of the mounting system on a mounting surface.

8. The mounting system of claim 6, wherein the elongate strut is centered in a top surface of the base.

9. The mounting system of claim 6, further comprising a clamp, mating to the channel for securing an elongate structure to the base.

10. The mounting system of claim 6, wherein the base comprises foam.

11. The mounting system of claim 6, wherein the elongate strut is plastic or metal.

12. The mounting system of claim 6, wherein the base is made of a weather resistant material.

13. The mounting system of claim 6, wherein the base comprises pliable closed cell polyethylene foam.

14. A method for mounting, comprising the step of:

securing an elongate structure to a mounting system having a pliable base with a clamp received within a channel in the base, wherein the pliable base provide a flexible mount for the elongate structure and conforms to a mounting surface to protect the mounting surface.

15. The method of claim 14, further comprising the steps of:

installing a plurality of pliable bases, each having a channel for receiving a clamp; and mounting one or more elongate structures to the plurality of pliable bases using the clamp.

* * * * *